United States Patent
Reed, III et al.

(10) Patent No.: US 6,814,383 B2
(45) Date of Patent: Nov. 9, 2004

(54) TAILGATING SYSTEM AND METHOD FOR TAILGATING

(75) Inventors: Silas Reed, III, Oxford, MS (US); Donald Keith Prevost, Oxford, MS (US); Jerry E. Redmond, Mississauga (CA)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/422,375

(22) Filed: Apr. 24, 2003

(65) Prior Publication Data

US 2004/0026946 A1 Feb. 12, 2004

Related U.S. Application Data

(60) Provisional application No. 60/319,208, filed on Apr. 26, 2002.

(51) Int. Cl.[7] .................................................. B60P 3/00
(52) U.S. Cl. .................. 296/24.3; 296/34.41; 296/37.6; 224/404; 224/495
(58) Field of Search ........................... 296/24.35, 24.36, 296/24.41, 24.3, 37.6, 37.1; 224/542, 498, 311, 404, 510, 281, 554; 126/41 R, 25 R, 4, 276, 266

(56) References Cited

U.S. PATENT DOCUMENTS

| 2,329,419 | A | * | 9/1943 | Reed | 296/176 |
| 2,784,027 | A | * | 3/1957 | Temp | 296/156 |
| 2,867,471 | A | * | 1/1959 | Coon, Jr. | 296/156 |
| 4,089,554 | A | * | 5/1978 | Myers | 296/37.1 |
| 4,143,902 | A | * | 3/1979 | Johnstone | 296/167 |
| 4,969,678 | A | * | 11/1990 | Loisel | 296/24.33 |
| 5,029,935 | A | * | 7/1991 | Dufrancatel | 296/156 |
| D341,553 | S | * | 11/1993 | Clawson | D12/106 |
| D367,202 | S | * | 2/1996 | Antolin et al. | D7/347 |
| 5,862,540 | A | * | 1/1999 | Chuan | 4/449 |
| 6,254,160 | B1 | * | 7/2001 | Marriott et al. | 296/24.46 |
| D460,656 | S | * | 7/2002 | Caulder | D7/332 |
| 6,575,155 | B2 | * | 6/2003 | Brennan | 126/41 R |
| 6,698,634 | B2 | * | 3/2004 | Thomson | 224/404 |

OTHER PUBLICATIONS

The Ultimate Outdoor COMBO Kitchen website (http://www.cookind.com/indes.php), 2003.*

Grill–n–Chill website (www.goproductsusa.com/Products/Grills_home.html), 2004.*

* cited by examiner

*Primary Examiner*—Patricia Engle
(74) *Attorney, Agent, or Firm*—Stephen Krefman; Robert O. Rice; John F. Colligan

(57) ABSTRACT

A vehicular tailgating system typically for mounting in or to a rear hatchback portion of a passenger-type vehicle is selectively interconnectable to a power source. In one aspect, the system described herein has a housing defining several temperature-specific chambers therein which are adapted to receive one of several interchangeable modules to provide a wide range of functionality to the system.

43 Claims, 19 Drawing Sheets

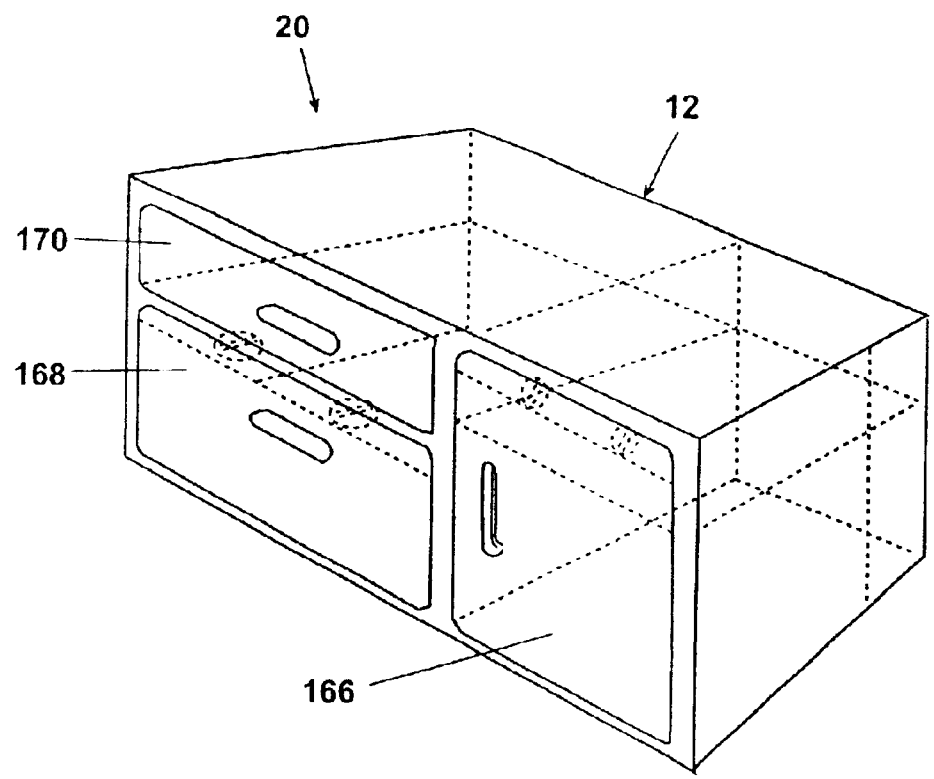
Fig. 12
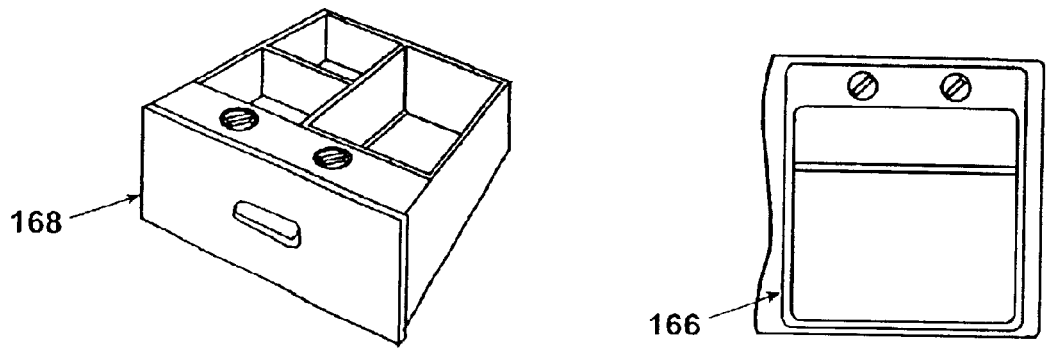
Fig. 14
Fig. 13

TAILGATING SYSTEM AND METHOD FOR TAILGATING

CROSS-REFERENCE TO RELATED APPLICATIONS

This application claims the benefit of U.S. Patent Application Ser. No. 60/319,208, filed Apr. 26, 2002.

FIELD OF THE INVENTION

The invention generally relates to a modular tailgating system for use in the preparation and enjoyment of food and beverages at a sporting or outdoor event. The invention further relates to a vehicular food, beverage and entertainment system typically for mounting in a rear portion of a passenger-type vehicle. In one aspect, the system described herein has a housing defining several temperature-specific chambers therein which are adapted to receive one of several interchangeable modules to provide a wide range of functionality to the system.

DESCRIPTION OF THE RELATED ART

While attending group gatherings such as sporting events, picnics, and children's sporting events such as Little League games, to enhance the enjoyment of the event, it has become commonplace to bring food and beverages in one's vehicle to consume once the vehicle has been parked at the group gathering. These types of group gatherings at sporting events are often referred to as "tailgate parties." Often, people gather around a hatchback portion of a typical vehicle (often a large passenger-style car such as a sport-utility vehicle or a minivan) or the bed of a truck and consume the food and beverages. The food and beverages are typically packed in foam or other insulated coolers. In the case of food and beverages which are desired to be kept cold, the food and beverages are packed in a cooler and typically surrounded with ice. In the case of food and beverages which are desired to be kept warm, the food and beverages are packed in a cooler after typically having been pre-cooked and packed in the cooler while still warm. In the case of food and beverages which are desired to be cooked at the group gathering site, the food is typically packed in a cooler with ice, and the attendees of the party often assemble a gas or charcoal grill adjacent to the vehicle after arriving at the site and cook the food thereon.

Food preparation and serving for these types of group gatherings is often difficult because of the outdoor location of the event and the portability required of the equipment, and it can be even more difficult than at home cooking to keep the food and beverages at a desired serving temperature. For example, if some of the food and beverages are needed to be kept at one temperature (such as a warm temperature) and other of the food and beverages are needed to be kept at another temperature (such as a cold temperature), the packing, assembly and transport of the food and beverages can be even more difficult. In addition, if any of the food needs to be cooked at the gathering site, the attendees must also bring a grill and an appropriate fuel source (such as charcoal). The number of coolers for warm food and beverages, coolers for cold food and beverages, coolers for food that needs to be kept cold prior to cooking, and a grill (as needed) can require a substantial amount of space in the vehicle is well as substantial inconvenience in packing the vehicle and unpacking the vehicle at the gathering site. For example, to attend a football game at a major college or professional team arena, attendees at a group gathering site prior to the football game often travel several hours to arrive at the gathering site and have a limited period of time in which to unpack the vehicle, prepare the food and beverages, cook any food on a grill, consume the food and beverages, and pack up the vehicle again with everything that was unloaded.

There have been previous attempts to make these types of group gatherings around a vehicle more convenient. For example, the "Grill and Chill" unit, available from Grill-N-Chill, is a box-like housing which supports a grill and a cooler in adjacent positions which is then carried in a hatchback portion of a suitable vehicle. Also, DJ systems has come up with a customized pickup truck installation which includes convenience features such as a grill (a high-end model available from Dynamic Cooking Systems), running water available from an onboard water tank, a small sink and a beer tap interconnectable to a beer tank apparently brought separately from the onboard truck installation.

However, the prior art still falls short of providing a full-service group gathering unit because the prior art still requires separate coolers for cooling and warming functions and, in the case of the DJ systems unit, the prior art must be permanently installed in the vehicle which has a bed of sufficient size to support the DJ systems unit. The vehicle of sufficient size must typically be the entire bed of a pickup truck or a sport-utility vehicle and/or a minivan (with both the second and the optional third row of seats removed).

SUMMARY OF THE INVENTION

The invention relates to a tailgating system preferably comprising food, beverage and entertainment systems, and which preferably retractably mounted within a rear hatchback portion of the vehicle, which can be easily reconfigured with modular components to easily provide a mixture of food- and beverage-cooling and warming functions as well as a food-cooking function. In various embodiments of the invention, the modular components which can be selectively attached to the system include, but are not limited to, warming drawers, cooling drawers, a refrigerator, a microwave, hot and cold beverage dispensers, an ice maker, a rotisserie, and a crockpot. In addition, the system includes a water sub-system which provides running water to a sink located on the system into the ice maker. Further, the system also includes an electrical sub-system which, in addition to providing power to each of the modular components which require it, also includes a computer- and relay-controlled power management system which can perform power cycling in management functions to conserve power, especially when running on onboard batteries for the system. The system can also include an entertainment sub-system which can include a compact disc player, a television, a cassette player, a video cassette recorder, a DVD player, a satellite dish, and any other audio or video component as well as one or more speakers to deliver sound independent of the vehicular stereo sound system.

In one aspect, the invention relates to a tailgating system for a vehicle comprising: a housing removably mountable to a vehicle and selectively interconnectable to a power source comprising at least one of a vehicle DC power source when the vehicle is in an unignited state, a vehicle DC power source when the vehicle is in an ignited state, and an AC power source, the housing having at least one recess defined therein; and at least two modular components having at least one of warming, cooling and cooking functionality, wherein at least one of the at least two modular components can be selectively received in the at least one recess and are interconnectable to the power source. The tailgating system can thereby be reconfigured for different events by selecting different ones of the at least two modular components and mounting the selected ones within the recess in the housing and connecting the same to the power source.

In various embodiments of the invention, at least one of the at least two modular components can comprise a warmer adapted to be removably mounted within the at least one recess of the housing and interconnected to the power source. At least one of the at least two modular components can comprise a warming drawer adapted to be slidably mounted within the at least one recess of the housing and interconnected to the power source. At least one of the at least two modular components can comprise a cooling drawer adapted to be slidably mounted within the at least one recess of the housing and interconnected to the power source. At least one of the at least two modular components can comprise a refrigerator adapted to be mounted within the at least one recess of the housing and interconnected to the power source. At least one of the at least two modular components can comprise a cooler adapted to be mounted within the at least one recess of the housing.

An entertainment system can be mounted to the housing and interconnected to the power source for providing entertainment to users of the system. The entertainment system can be, e.g., an audio entertainment system mounted to the housing and interconnected to the power source for providing audible entertainment to users of the system, or a video entertainment system mounted to the housing and interconnected to the power source for providing visible entertainment to users of the system.

The housing can be divided into a warm zone and a cool zone, wherein the warm zone is heated by a temperature increaser, and wherein the cool zone is cooled by a temperature decreaser. An insulation layer can separate the warm and cool zones.

A sink can be mounted to the housing. At least one fresh water tank can be mounted to the housing for dispensing fresh water into the sink. The fresh water tank can be in fluid communication with a warm zone within the housing to heat water dispensed from the tank into the sink. A water heater can be mounted to the housing to heat water dispensed from the tank into the sink. An icemaker can be fluidly interconnected to the fresh water tank. A waste tank can be mounted to the housing and fluidly interconnected to the at least one recess for collecting waste therefrom. The sink can have a drain, wherein the drain in the sink can be fluidly interconnected to the waste tank. The waste tank can thereby receive waste fluid exiting the sink through the drain.

A beverage dispenser can be mounted to the housing comprising a stored volume of a preselected beverage and a dispenser operably interconnected to the stored volume for selected dispensing of the beverage therein. The beverage dispenser can further comprise a source of pressurized fluid interconnected to the stored volume of beverage for carbonation thereof.

A top surface of the housing can further comprise at least one cookstove burner thereon, the at least one burner being interconnected to the power source. A cooking device can be mounted to the housing for movement between a stored position proximate the housing and a use position distal to the housing. The cooking device can be detachably mounted to the housing and, in the use position, the cooking device can be disconnected from the housing. The cooking device can be, e.g., a grill. The grill can, e.g., employ charcoal as a cooking fuel or can also employ ignited gas as a cooking fuel.

A power source detector can be provided on the housing that is interconnected to the power source for determining the particular source of power supplied to the housing. A power optimizer can be operably interconnected to the power source detector for optimizing the power supplied to at least one of the onboard modular components. A power cycling component can be provided that is interconnectable to the power source for periodically preventing at least one of the onboard modular components from drawing power from the power source to conserve energy required by the system.

The vehicle can have one of a hitch and a hitch receiver on a rear portion thereof, the housing has the other of a hitch and a hitch receiver on a forward portion thereof, and the housing is provided with a pair of ground-engaging wheels whereby the housing can be towed behind the vehicle when the hitch receiver is mounted to the hitch. The vehicle can also have a rear storage portion thereof provided with a pair of elongated rails in generally juxtaposed parallel relationship and the housing is slidably mounted within the vehicle rear storage portion upon the rails between a retracted and an extended position.

In another aspect, the invention relates to a method for preparing a system for a tailgating event, the system including a housing with at least one recess defined therein, and wherein the housing is selectively interconnectable to a power source, the method comprises the steps of: choosing at least one modular component having at least one of warming, cooling and cooking functionality based on characteristics of the tailgating event; and mounting the chosen at least one modular component to a corresponding one of the at least one recess in the housing.

The method can also comprise the step of operably interconnecting the chosen at least one module component to the power source. The power source can comprise at least one of a vehicle DC power source when the vehicle is in an unignited state, a vehicle DC power source when the vehicle is in an ignited state, and an AC power source. The method can also further comprise the step of reconfiguring the system with different onboard modular components for a different tailgating event with different characteristics.

DESCRIPTION OF THE FIGURES

FIG. 12 is another alternative embodiment of the system shown in FIG. 1.

FIG. 13 is an example of a modular component used in the system of FIG. 1 comprising a mini-refrigerator unit.

FIG. 14 is an example of a modular component used in the system of FIG. 1 comprising a warming and/or cooling drawer.

DESCRIPTION OF THE PREFERRED EMBODIMENTS

Figure 1:
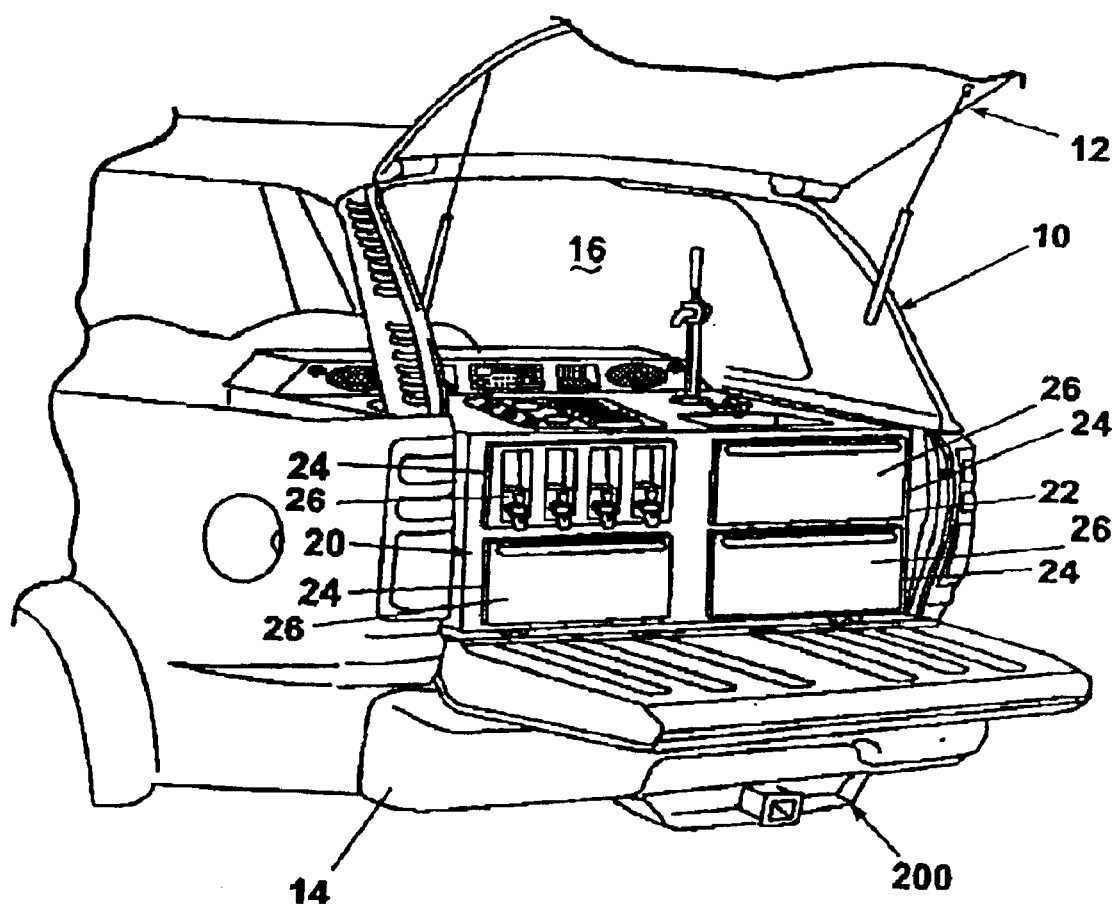
FIG. 1 is a rear elevational view of a vehicle having a hatchback in a raised position showing a tailgating system including food, beverage and entertainment systems positioned therein according to the invention.
Figure 2:
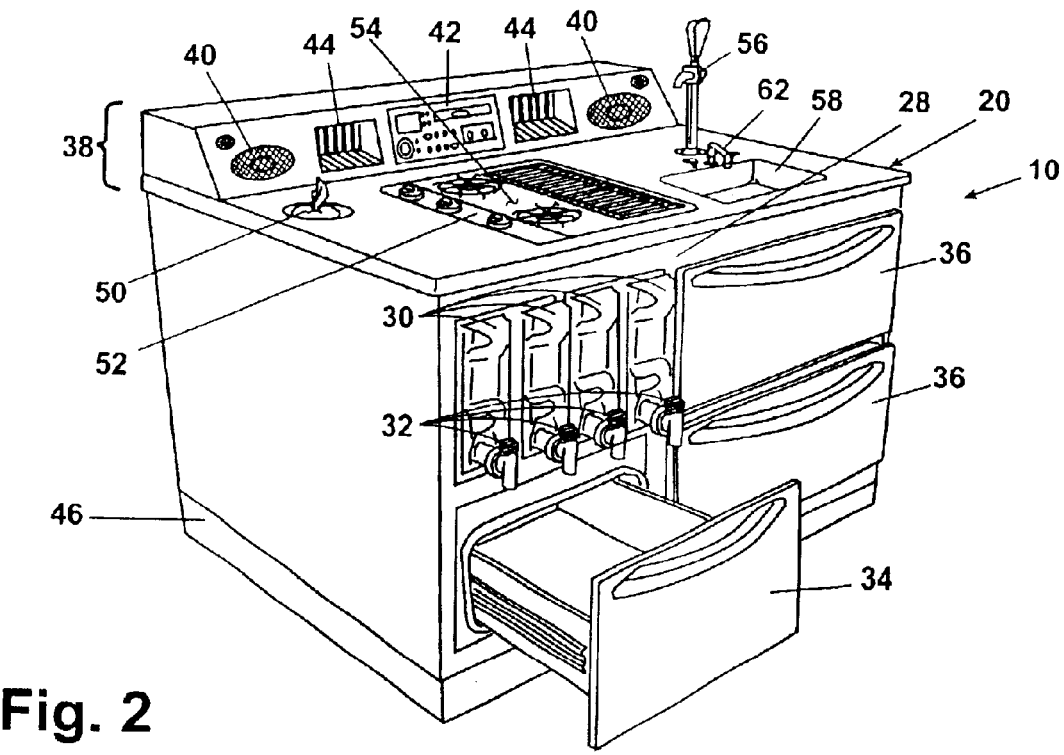
FIG. 2 is a perspective view of the system of FIG. 1 removed from the vehicle.

Referring now to the drawings and to FIG. 1 in particular, a vehicle 10 having a hatchback 12 shown in a raised position with respect to a rear portion 14 of the vehicle 10 is illustrated. It will be understood that a particular type of vehicle 10 is not required for the purposes of this invention and that the sport-utility vehicle and minivan vehicles shown in the drawings of this application shall not be construed as limiting on the scope of the invention. As shown in FIG. 1, a hatchback recess 16 is typically defined within the rear portion 14 of the vehicle 10 and provides the space in which a tailgating system 20 according to the invention can be stored, transported, and used for group gatherings.

Referring now to FIGS. 1–6, it can be seen that the system 20 comprises a housing 22 having one or more, and preferably several, recesses 24 adapted to receive a corresponding modular component 26. In the example shown in the embodiment of FIGS. 1–6, the particular types of modular components 26 will be described with specificity, however, it will be understood that is a feature of this invention that the modular components 26 can be rearranged within different recesses 24, or added and/or removed altogether, in order to provide the desired functionality to the system 20 as desired for a particular group gathering and to enable a user to easily reconfigure the system 20 for another group gathering without substantial time and effort.

It will be understood that the housing 22 is preferably made from a material that is lightweight and can be finished in an aesthetically-pleasing manner. Examples of preferable materials for making the housing 22 include aluminum, stainless steel, wood, synthetic resins, fiberglass or even composite materials. It is contemplated that the housing 22 can be constructed of a composite material such as that making up lightweight boat hulls, in which a balsa wood core is resin-coated on each side with a polymeric material. With an appropriate material, the housing 22 can be finished in a variety of colors and finishes, including an automotive-type paint finish to provide a high-quality, durable and aesthetically-pleasing finish to the housing 22. Further, the housing 22 can be decorated, such as with air-brushing and other artistic techniques, to add visible indicia to the exterior of the housing 22, such as a college or professional team insignia and the like.

Figure 3:
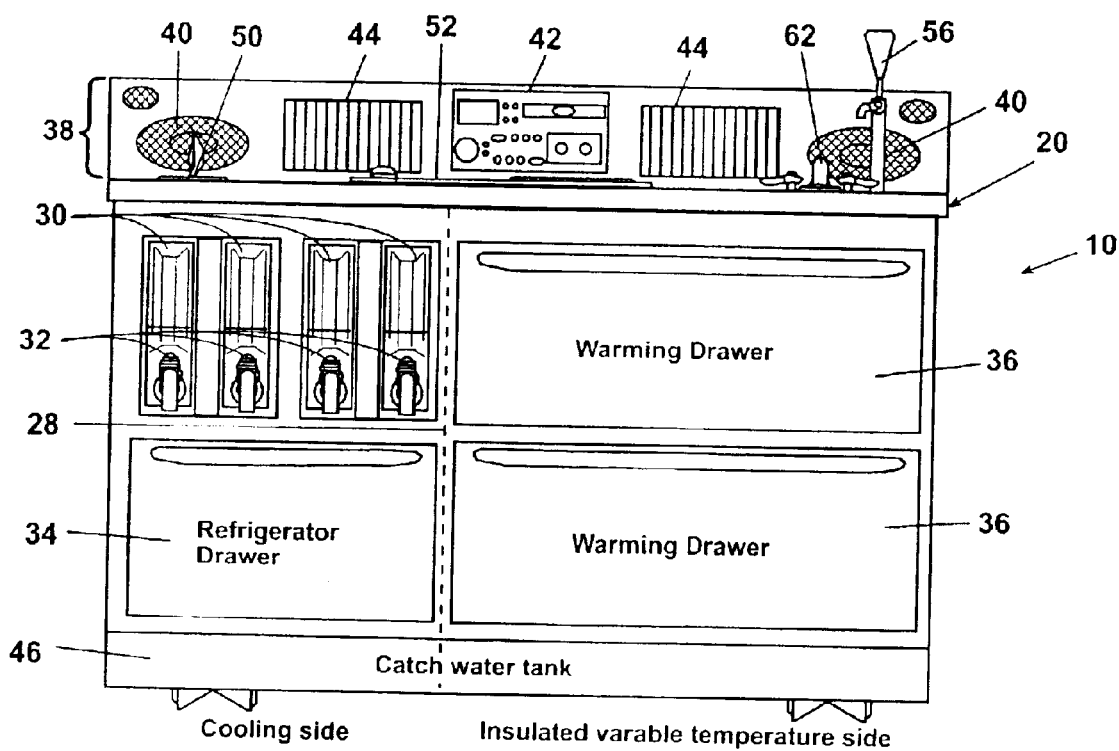
FIG. 3 is a front elevational view of the system of FIG. 1 showing an example configuration of the system of FIG. 1 including modules with cold food and beverage functionality, modules with warm food and beverage functionality, modules with a food cooking functionality, and other features for convenience.

Turning to FIG. 3, one sample configuration for the system 20 is shown. In this example, in the orientation shown in FIG. 3, the left side of the housing 20 is provided as a "cool" chamber and the right side of the housing 22 is provided as a "warm" chamber separated by an insulator 28. The insulator 28 can be, for example, as simple as a panel of foam material. Of course, it will be understood that the insulator 28 could also surround each of the desired modular components 26 and is not required to separate the housing 22 into separate temperature zones but is shown only herein as an example.

The modular components 26 provided in the "cool" zone on the system 20 include several beverage containers 30 having beverage dispenser spigots 32 thereon. As will be understood, since the entire left side of the housing 22 is created as a cool zone, the beverage containers 30 (and any beverages contained therein) simply by being present within the refrigerated "cool" zone of the housing 22 as defined by the insulator 28. The modular components 26 provided in the "cool" zone also included a refrigerated drawer 34 which provides a refrigerated chamber for storage of foodstuffs. With this configuration, beverages which are intended to remain cold can be stored within the beverage containers 30 and easily dispensed into cups at the group gathering via actuation of the spigots 32. Foodstuffs which are intended to remain cold can be stored within the refrigerated drawer 34 and accessed, as will be apparent, by extension and retraction of the drawer 34 as needed. A mini-refrigerator can be substituted for the refrigerated drawer without departing from the scope of this invention.

Figure 3A:
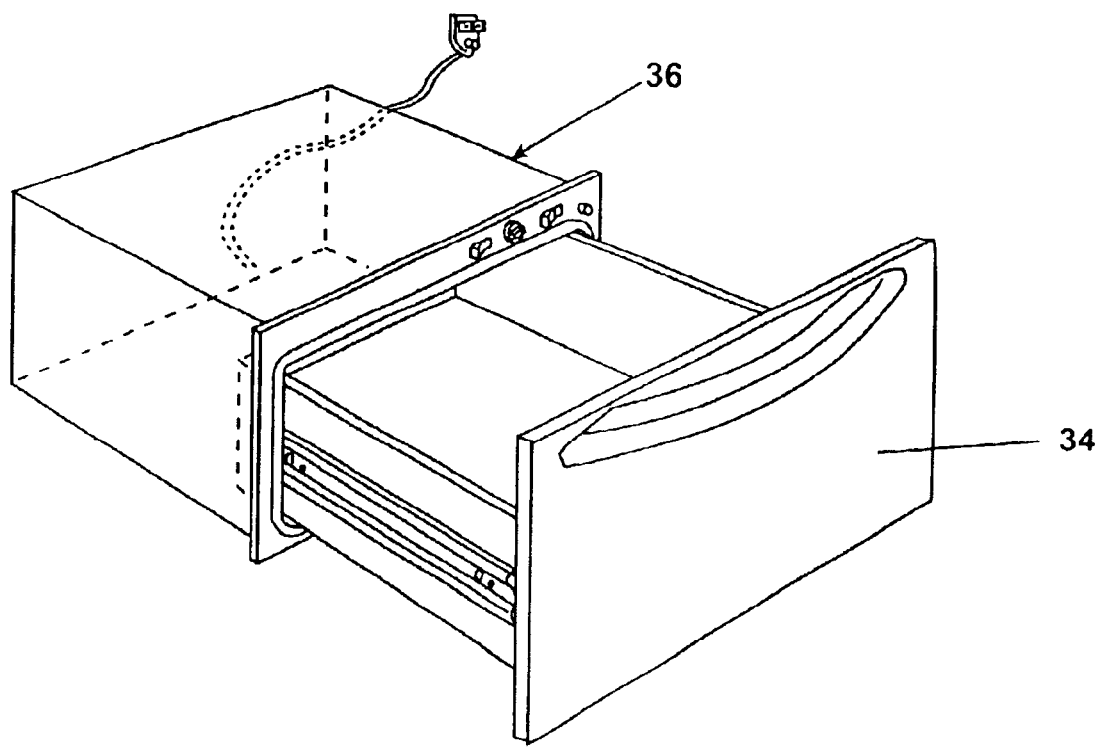
FIG. 3A is a perspective view of an example module installable into the tailgating system of FIG. 1 according to the invention, wherein the module is shown as a warming drawer having warm food functionality.

The modular components 26 provided in the "warm" zone include a warming drawer 36 which is provided in each of the corresponding recesses in the "warm" zone of the housing 22. Other modular components 26 contemplated for use and installation within the recesses 24 in the "warm" zone of the housing 22 include a portable grill, which could be slidably and/or pivotably mounted within a particular recess 24 in the "warm" zone so that a user could extend the portable grill from the recess 24 into a use position wherein foodstuffs could be cooked thereon. The modular components 26 for the "warm" zone can also be outfitted with other modular components for keeping food warm such as a warming drawer 36 outfitted with one or more crockpots, a rotisserie for cooking poultry and other foodstuffs, and other rackable pans and wire racks and the like. FIG. 3A is a perspective view of an example warming drawer 36 installable into the tailgating system 20 according to the invention. The warming drawer 36 shown in FIG. 3A is a Warming Drawer Model KEWD175 available from KitchenAid Brand Home Appliances, 553 Benson Road, Benton Harbor, Mich., 49022-2400 and is shown by example and not in limitation of the invention.

An entertainment subsystem 38 is also provided on an upper surface of the housing 22 and provides audio and/or visual entertainment to attendees at the group gathering. The entertainment subsystem 38 can include a pair of audio speakers 40 and a subwoofer (not shown) installed within the housing 22 to provide an audible response from a stereo unit 42 operably interconnected thereto, which can include, but is not limited to, a compact disc player, a DVD player, a cassette player, a radio (including satellite radio) and the like. A pair of compact disc storage racks (or any suitable media storage rack) 44 can be provided in between the speakers 40 and the stereo unit 42 to allow a user to conveniently store music, video and any other audiovisual media for playing at the group gathering. Also, a video screen (not shown) can be provided on the entertainment subsystem 38 (or anywhere else on the housing 22) where it can be conveniently viewed by attendees at the group gathering. One suitable example of an alternate location for the video screen could be an external face of a warming drawer 36, whereby the video screen could be positioned on a front face of the housing 22 and easily viewable by attendees at the group gathering.

Figure 4:
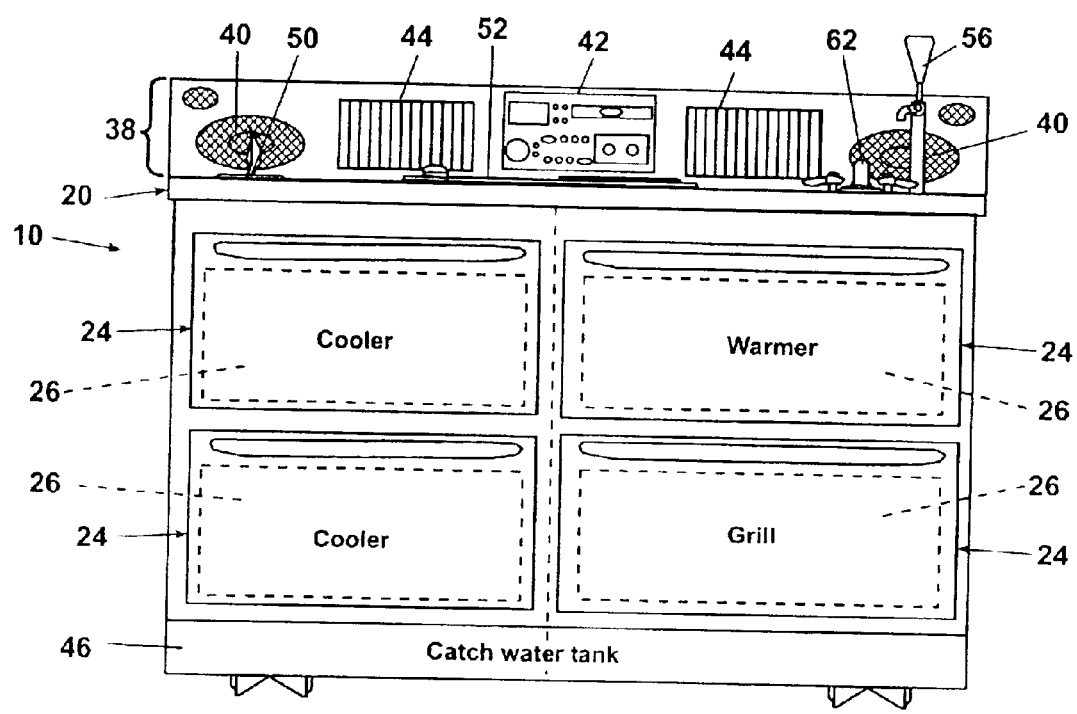
FIG. 4 is a front elevational view of a schematic drawing of the system of FIG. 1 showing examples of locations for the various modules.
Figure 5:
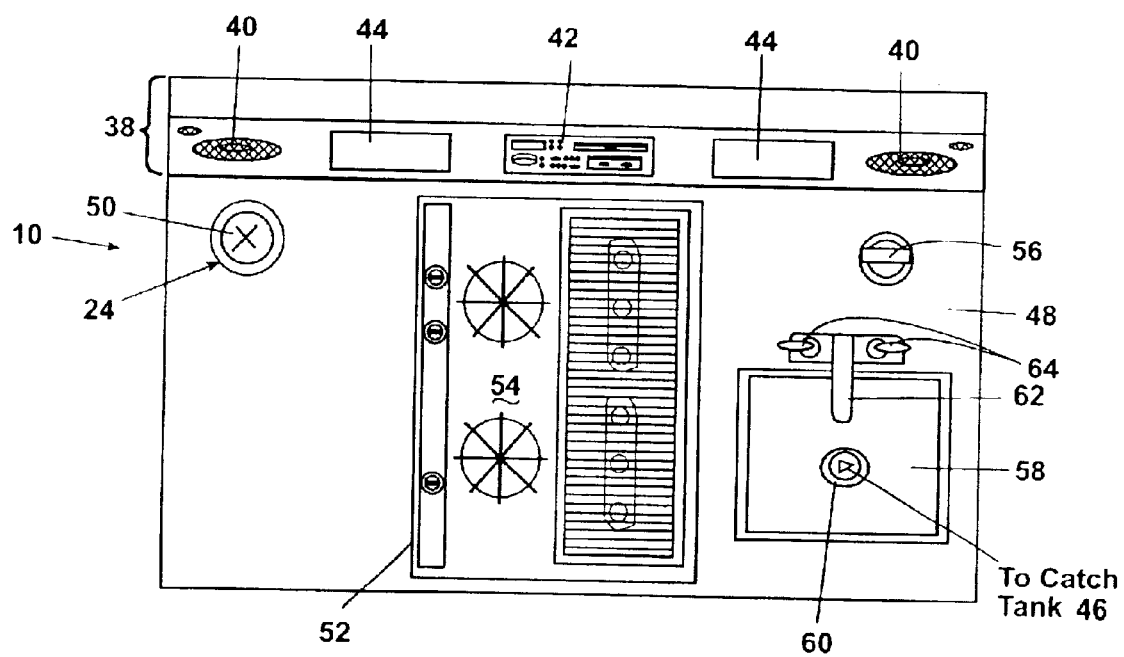
FIG. 5 is a top plan view of the system of FIG. 1 showing examples of locations for various modules for the system including, for example, a carbonated beverage dispenser, a sink, a stove, and a cleaning supply dispenser.
Figure 6:
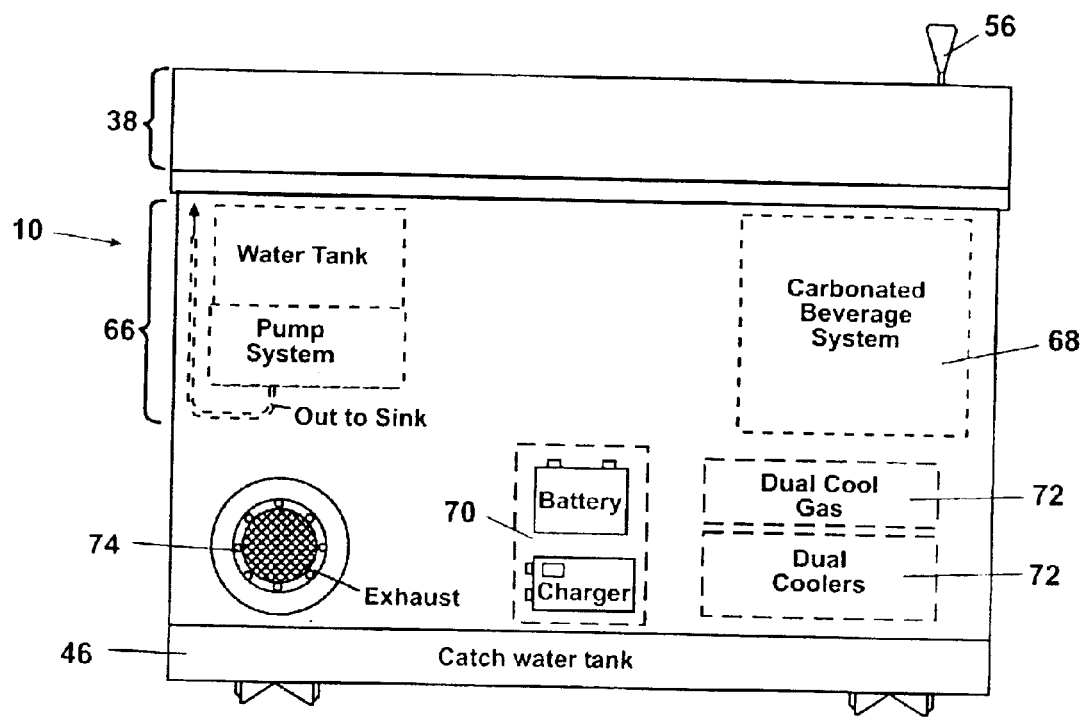
FIG. 6 as a rear elevational view of a schematic of the system of FIG. 1 showing various locations of a water sub-system, a carbonated beverage dispenser subsystem and an electrical sub-system as well as a warming sub-system exhaust port.

Turning to FIGS. 4–6, the tailgating system 20 is shown schematically in front, top and back views. The warm and cool modules 26 are shown on the front face of the system 20 as well as the entertainment subsystem 38. A waste tank 46 is shown adjacent a bottom portion of the system 20 and is preferably fluidly interconnected with the interior of the housing 22 to collect wastewater and condensation emitted from the components of the system 20. A top surface 48 of the system 20 (as shown in FIG. 5) preferably includes additional components which provide additional convenience and usability to the system 20. For example, a dispenser 50 is located on the top surface 48 for dispensing towelettes. In addition, the dispenser 50 can be simply a recess adapted to receive a commercially-packaged container of towelettes. The top surface 48 can also include a cup dispenser (not shown). A recess 52 is also provided on the top surface 48 which preferably contains a removable stove/burner unit 54. In use, the user can remove the stove/burner unit 54 from the top surface 48 and place the unit elsewhere to perform cooking operations. The top surface 48 also includes a handle dispenser 56 for a carbonated beverage dispenser such as a beer tap. The beer tap is described in greater detail below. The top surface 48 also includes a sink 58 having a drain 60 fluidly interconnected to the catch tank 46 as well as a typical faucet 62 and hot and cold actuators 64. Of course, the hot and cold actuators 64 could also be contained in a single-pull actuator as is well known in the sink actuator art.

Turning to FIG. 6, a rear portion of the housing 22 of the system 20 is shown in detail with additional features of the system 20 shown generally in schematic format. A water subsystem 66 is shown which is interconnected to both the sink 58 on the top surface 48 of the system 20 as well as to the waste tank 46 at a bottom portion thereof. A carbonated beverage subsystem 68 is shown adjacent to the water subsystem 66 and is provided for the dispensation of a desired beverage to users in a manner which will be hereinafter described. An electrical subsystem 70 is shown which manages the interconnection of the system 20 to an appropriate power supply including alternating current, a direct-current or onboard batteries which will also be hereinafter described. A pair of air-conditioning devices 72 are shown on the rear portion of the housing 22 as well as a heated air exhaust vent 74 which provides an egress to heated air located within the housing 22 such as that generated by the warming drawer 36 or portable grill carried thereon.

Figure 7:
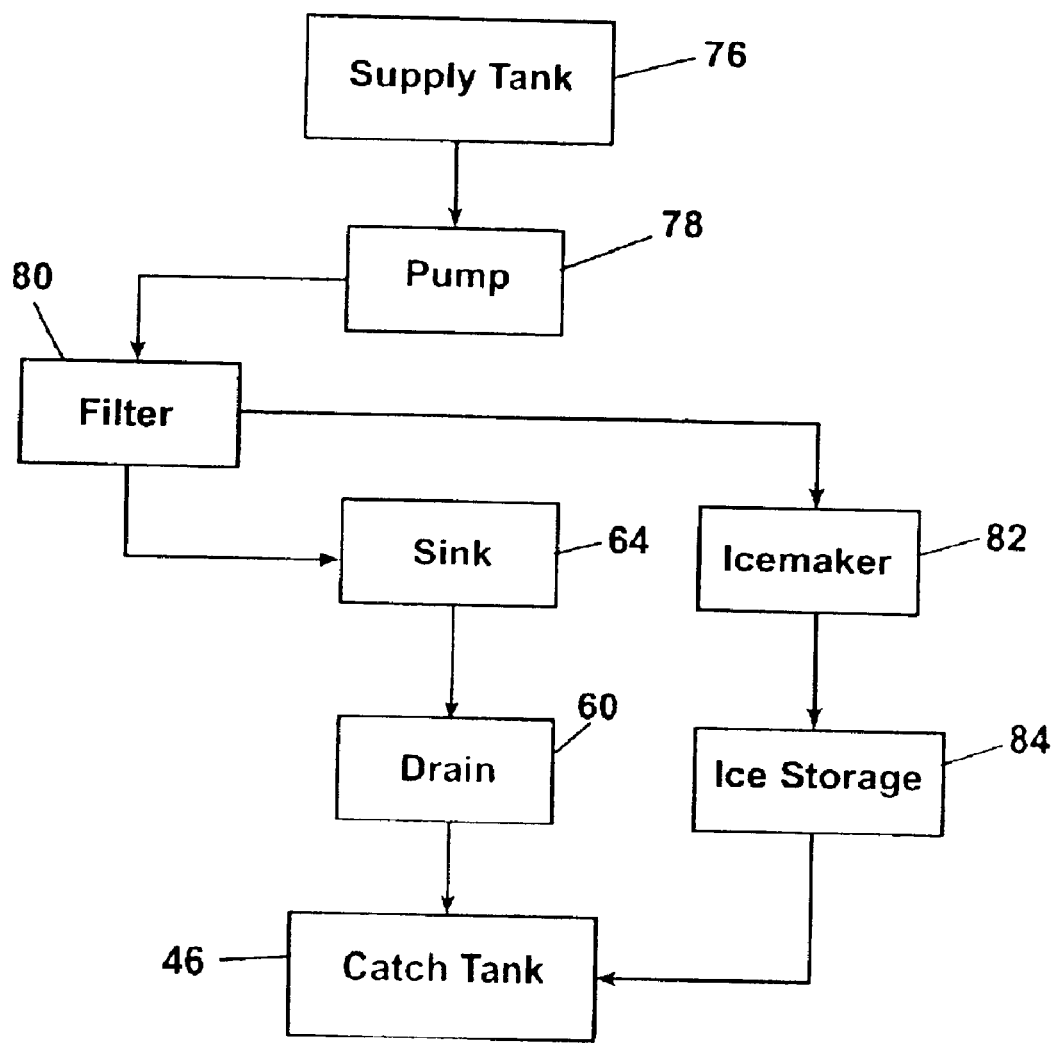
FIG. 7 is a schematic drawing of the components making up the water subsystem of the system of FIG. 1.

Turning to FIG. 7, the water subsystem 66 will be described in greater detail. It will be understood that, although the components of the water subsystem are shown in schematic, any of a number of commercially-available products can accomplish the structure and function of the components of the water subsystem 66 without departing from the scope of this invention. The water subsystem 66 preferably comprises a supply tank 76 fluidly interconnected to a pump 78 which, in turn, has an output fluidly interconnected to a filter 80. The filter 80 preferably has a pair of outputs fluidly interconnected to the sink actuators 64 on the top surface 48 of the housing 22 as well as to an onboard icemaker 82. The sink actuators 64 dispense water into the sink 58 via the faucet 62 and into the drain 60 which, in turn, is fluidly interconnected to the catch tank 46 at the bottom of the housing 22. Also, the onboard icemaker 82 can dispense ice into an ice storage container 84 (which can be a designated portion of a "cool" zone module 26 located on the housing 22) or a separate container specially designated for the receipt of the ice from the icemaker 82. It has been found that one desirable option for the pump 78 is a demand-style pump such as model 2088-422-444 available from SHURflo. It is also been found that one desirable option for the filter 80 is an in-line Culligan water filter model number US-316.

Figure 8:
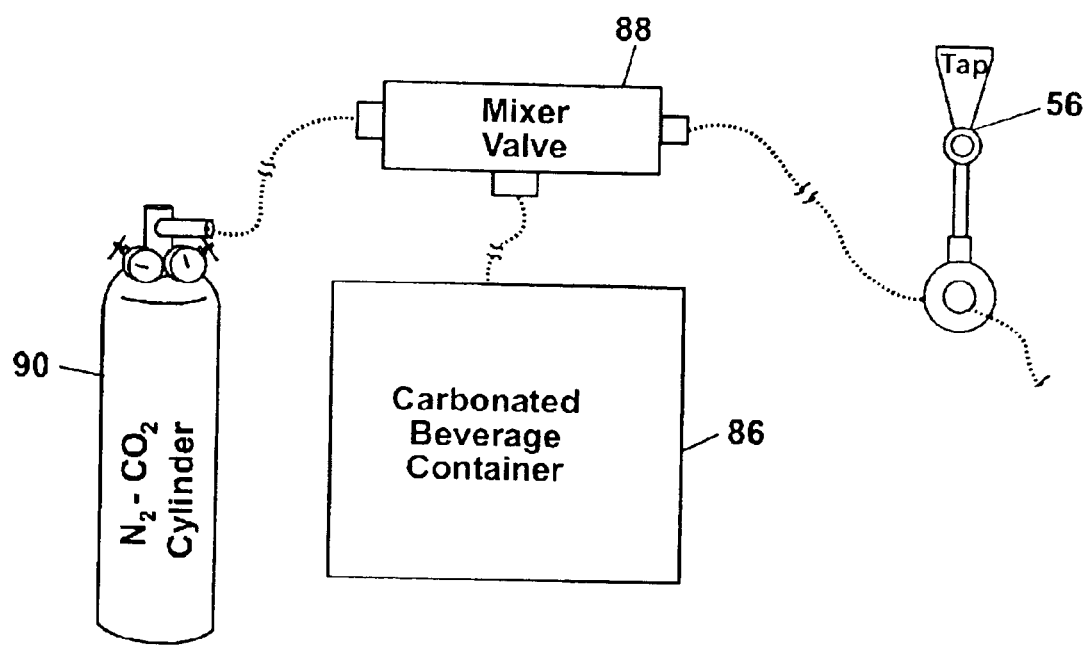
FIG. 8 is a schematic drawing of the components making up the carbonated beverage dispenser sub-system of the system of FIG. 1.

Turning to FIG. 8, the carbonated beverage subsystem 68 will be described in greater detail. It will be understood that, although the components of the carbonated beverage subsystem 68 are shown in schematic, any other number of commercially-available products can accomplish the structure and function of the components of the carbonated beverage subsystem 68 without departing from the scope of this invention. The carbonated beverage subsystem 68 shown in the drawings is configured to dispense beer but could also be reconfigured easily with the number of commercially-available products to dispense soda from a carbonation, water and soda syrup system, preferably comprises a beverage supply tank 86 having a mixer valve 88 attached to an outlet thereof. The mixer valve 88 also has a fluid interconnection to a carbonation supply 90. As shown in the drawings, the carbonation supply 90 preferably comprises a 70–30 nitrogen-carbon dioxide mixture cylinder at a preselected pressure (such as 20 psi) as has been known to produce desirable results in the beer dispensation art. An outlet of the mixer valve 88 is fluidly interconnected to the beer tap 56 on the top surface 48 of the housing 22. Of course, it can be seen that in use a user need merely grasp a handle of the beer tap 56 with a cup held beneath the beer tap 56 which causes the mixer valve 88 to make an appropriate mixture of the beer supply in the beverage supply tank 86 with the gas contained in the carbonation supply 90 to provide a desirable mixture of beverage for the user. The tank 86 containing the compressed $CO_2$ could also be used to hold other compressed fluids. For example, compressed air could be stored in the tank and in combination with a traditional air hose, the compressed air can be used to inflate items or blow away debris for cleaning.

Figure 8A:
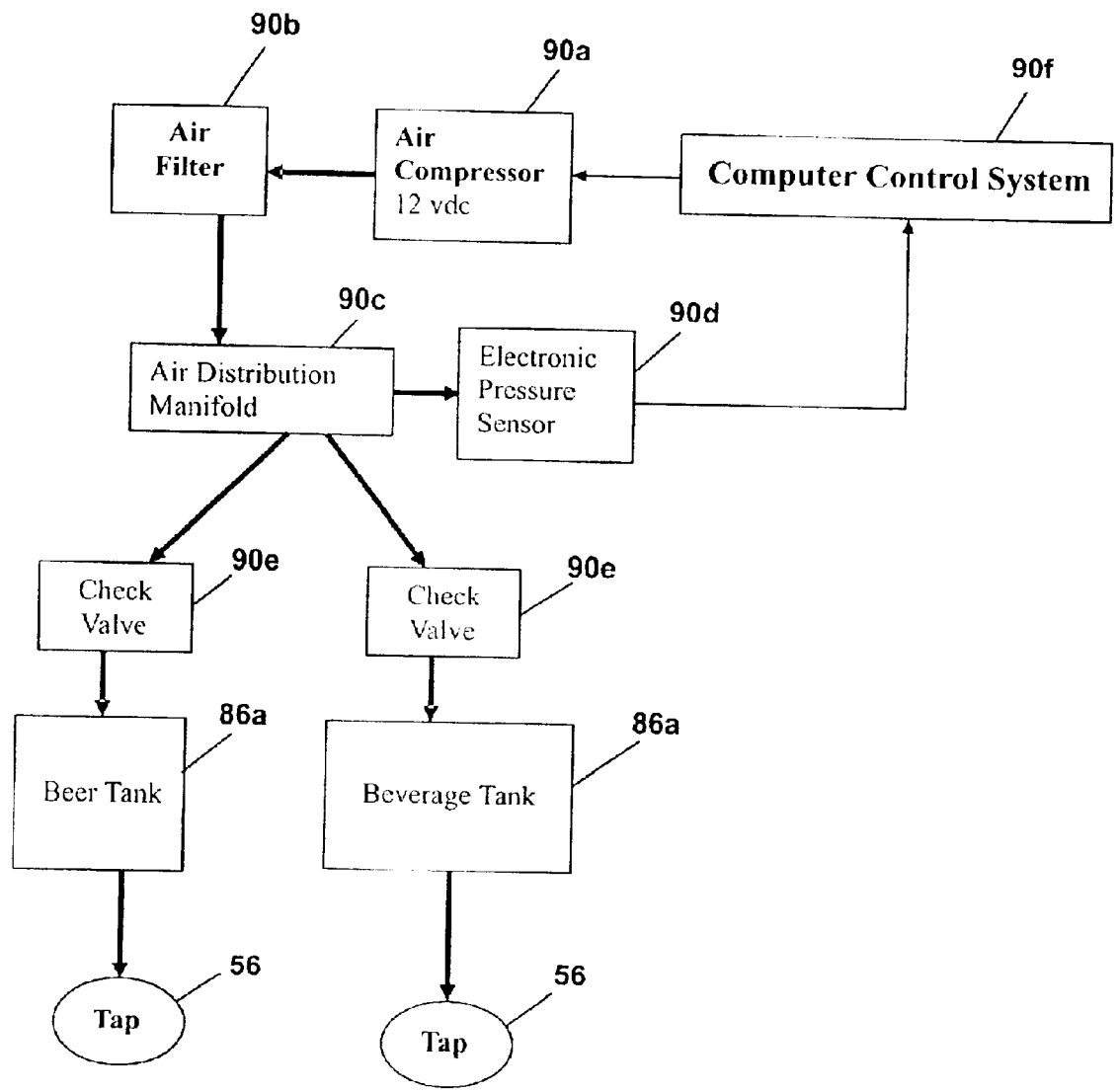
FIG. 8A is a schematic drawing of the components making up an alternative embodiment of the beverage dispenser sub-system of the system of FIG. 8.

An alternative embodiment of the beverage subsystem is shown by example in FIG. 8A. The alternative embodiment comprises an air compressor 90a fluidly interconnected inline with an air distribution manifold 90c via an optional air filter 90b. An electronic pressure sensor 90d can be fluidically interconnected to the air distribution manifold 90c for feeding at least one signal representative of the pressure in the air distribution manifold 90c back to a computer control system 90f. In addition to being connected to the computer control system 90f, the air distribution manifold has at least one outlet (two outlets are shown in FIG. 8A) interconnected to corresponding beverage tanks, such as the beer tank and beverage tank each shown by example in FIG. 8A by reference numeral 86a. As can be seen in FIG. 8A, an optional check valve 90e can be disposed between the air distribution manifold 90c and each of the tanks 86a. Conventional taps 56 are fluidly interconnected to the tanks 86a for dispensing beverages from the tanks 86a (which have been pressurized by the embodiment of the beverage subsystem shown in FIG. 8A) in a manner which will be apparent to one skilled in the art.

It will be understood that the number of components making up the alternative embodiment of the beverage subsystem is shown by example only and that any number of components may be used without departing from the scope of this invention.

In use, the air compressor 90a, operating on an appropriate inline voltage, provides a supply of pressurized air to the air filter 90b and subsequently to the air distribution manifold 90c. The air distribution manifold 90c thus functions as a conduit of pressurized air to the tanks 86a for pressurizing the tanks and facilitating the dispensation of pressurized beverages therefrom. Pressurized air is delivered, upon opening of the check valve(s) 90e, from the air distribution manifold 90c to the tanks 86a in a manner consistent with maintaining a suitable pressure in the tanks 86a to assist in the dispensation of beverages therefrom. A user would then simply actuate the tap 56 associated with the desired beverage tank 86a to obtain a flow of the desired beverage from the corresponding tank 86a.

The computer control system provides greater control over this embodiment of the beverage subsystem. For example, the computer control system 90f can cycle the air compressor 90a based on desired pressure set points and actual line pressure measured by the pressure sensor 90d in the air distribution manifold 90c. The computer control system 90f can also create a desired pressure depending on the particular beverage being dispensed. For example, soda pop may be desired to be dispensed at a first pressure and fruit juice may be desired to be dispensed at a second pressure. Along the same lines, the computer control system allows a user to set optimum dispensing pressure for beverages, such as beer, to minimize foaming and to permit the dispensing of more viscous beverages, e.g., tomato juice.

The computer control system 90f can include a user interface, such as a control panel, which allows users of the system to easily set program parameters. Although any suitable pressure range for dispensing beverages is contemplated by this invention, it is a preferred embodiment of this invention that the beverage subsystem work in a pressure range of 0.1 to 15 psi which is a preferred range within which to dispense pressurized beverages. The computer control system 90f would also not allow operation of the air compressor 90a while the vehicle is being operated. The computer control system 90f can also have an optimizer algorithm to minimize power consumption, reduce nuisance cycling and maintain a precisely regulated pressure without the use of pressure tanks and external regulators. The beverage sub-system shown in FIG. 8A can be operated safely and at a reasonably low pressure to minimize risk of injury—in that basic components used to make the fluid connections between the components of the beverage subsystem can have pressure ratings much higher (even as high as 65 psi rating per connector) than the inline operating pressure range of the preferred embodiment.

Distinguishing this embodiment of the beverage subsystem in FIG. 8A from that shown in FIG. 8, this embodiment is used for pressurizing the tanks 86a to assist in the dispensation of beverages therefrom, rather than assisting in the carbonation of the beverages as in the FIG. 8 embodiment.

Figure 9:
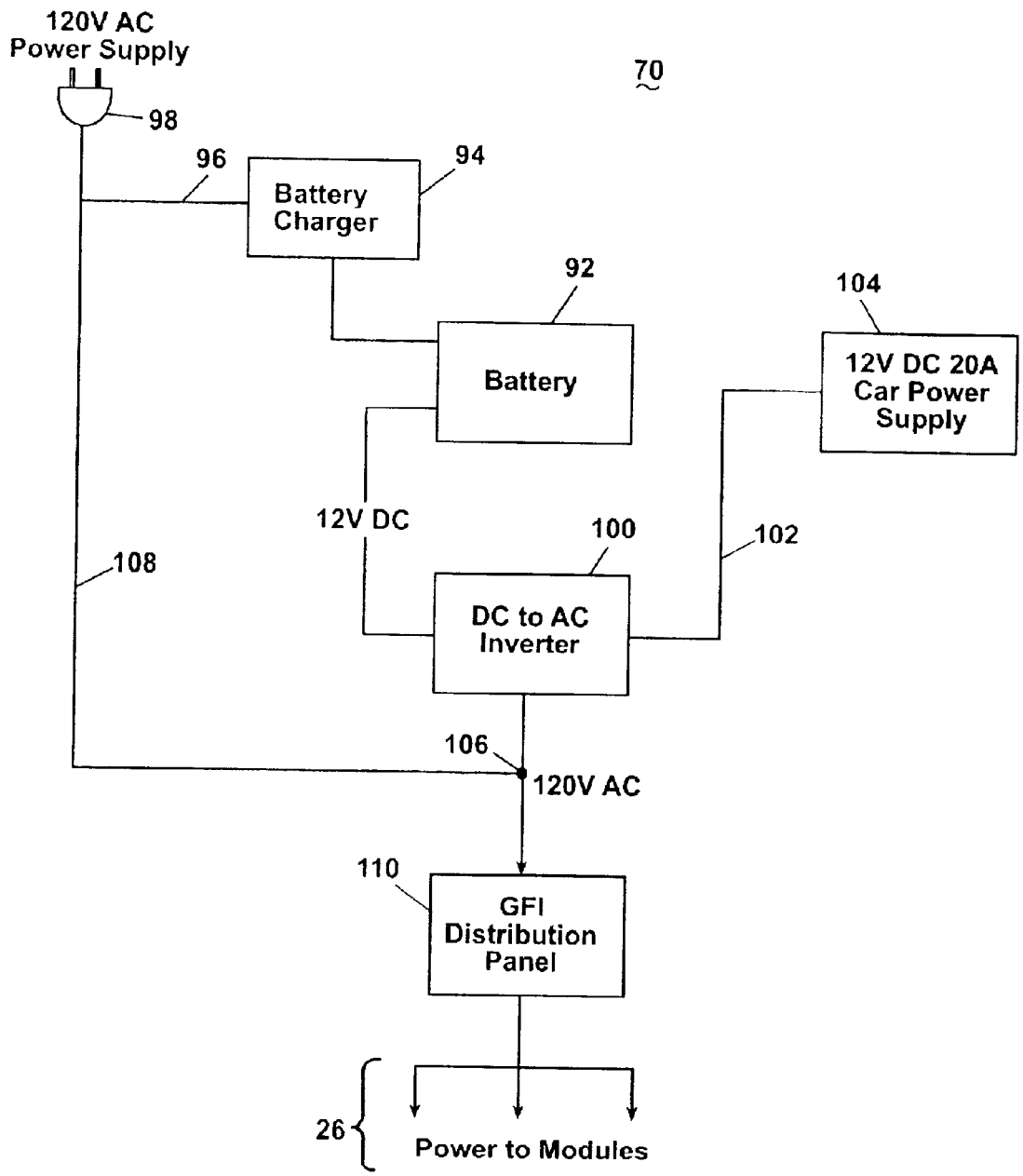
FIG. 9 is a schematic drawing of the components making up the electrical subsystem of the system of FIG. 1.
Figure 10:
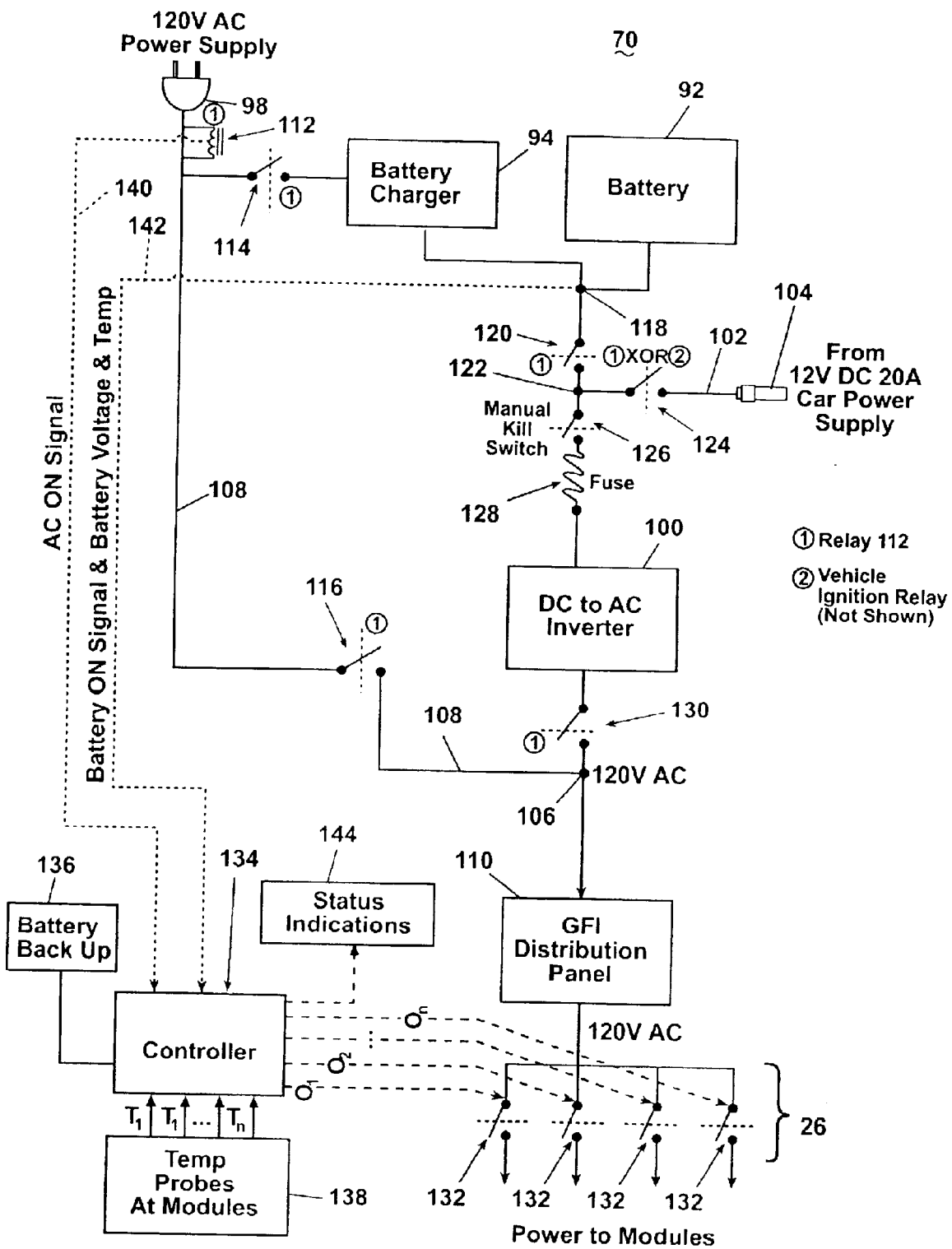
FIG. 10 is a schematic drawing of the components making up the electrical subsystem in greater detail than that shown in FIG. 9.
Figure 11:
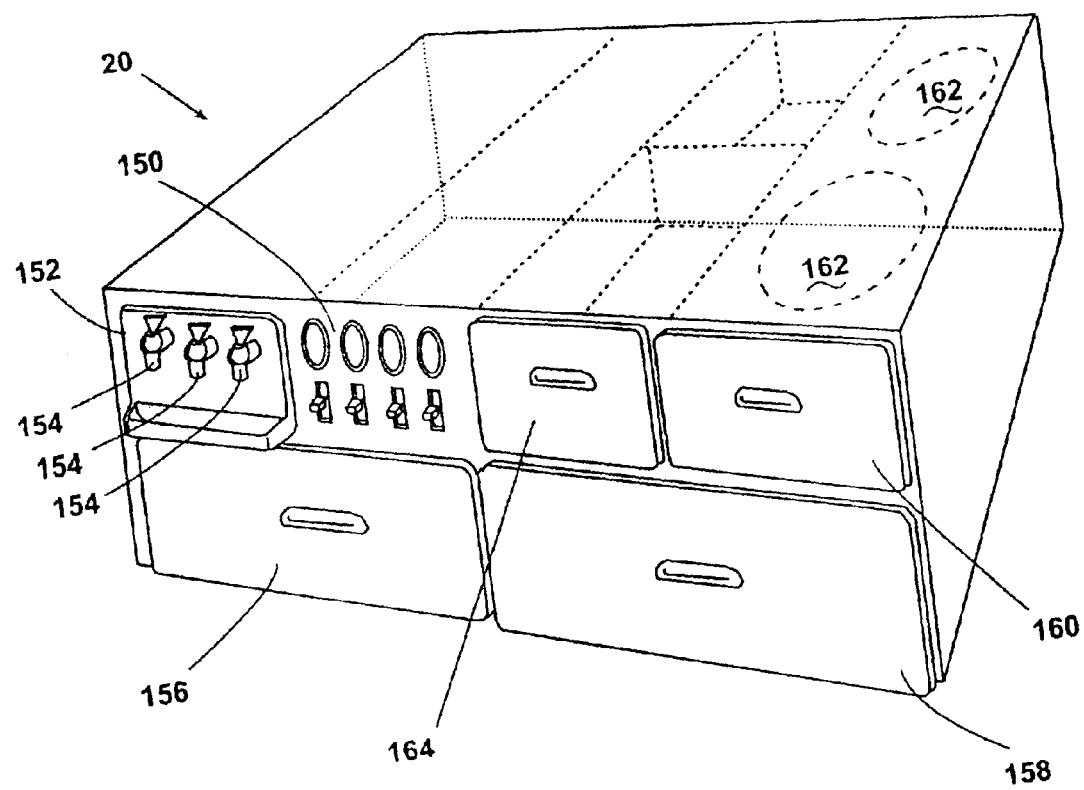
FIG. 11 is an alternative embodiment (i.e., a different configuration) of the system shown in FIG. 1.

Turning to FIGS. 9–10, the electrical subsystem 70 will be described in greater detail. It will be understood that, although the components of the electrical subsystem 70 are shown in schematic, any of the number of commercially-available products can accomplish the structure and function of the components of the electrical subsystem 70 without departing from the scope of this invention. As shown in the drawings, FIG. 9 shows a basic embodiment of the electrical subsystem 70, while FIG. 10 shows a more detailed embodiment of the electrical subsystem 70 including a switching system for determining which type of power supply (i.e., AC, DC or onboard battery supply) is powering the system 20.

First, with respect to FIG. 9, the electrical subsystem 70 comprises an onboard battery supply 92 operably interconnected to a battery charger 94. The battery charger 94 includes a power cord 96 which preferably terminates in a conventional 120-volt AC power plug 98. The onboard battery supply 92, which is shown as a single battery but can comprise a plurality of batteries interconnected together, is also interconnected to a DC-to-AC inverter 100. The inverter 100 also has an input via an appropriate cable 102 to a typical 12-volt DC car power jack 104 which is preferably adapted to be interfit with a standard cigarette lighter socket in a vehicle. The inverter 100 also has an output node 106 which outputs standard 120-volt AC power. The node 106 is also interconnected by a suitable connection 108 to the plug 98 to create a common AC power supply. The node 106 extends into a ground fault interrupt power distribution panel 110 which, in turn, distributes power to the module 26 contained in the system 20.

Turning to FIG. 10, the switching system for the electrical subsystem 70 will now be described. It will be understood that FIG. 10 has several elements identical to those shown in FIG. 9, whereby like elements are described with like reference numerals and the like elements are not re-described with respect to FIG. 10 that were already described in FIG. 9. As shown in FIG. 10, a relay switch 112 is provided between the plug 98 and the AC nodes 96 and 108. The relay switch 112 is labeled with a circled number 1 which, as will be described below, indicates which of the switches in the switching system are controlled by operation of the relay 112. A first switch 114 is provided between the relay 112 and the connection 96 and a second switch 116 is provided between the relay 112 and the connection 108. Each of the first and second switches 114 and 116 is also identified with a circled number 1 indicating a connection to the relay switch 112, i.e., actuation of the relay switch 112 will actuate the first and second switches 114 and 116 from their normally open state to a closed state, and vice versa.

As also can be seen in FIG. 10, the onboard battery supply 92 and the battery charger 94 are interconnected at their outputs to a common node 118 which, in turn, is interconnected to a third switch 120 which then terminates in another node 122. The third switch 120 is also identified with a circled number 1 indicating a connection to the relay switch 112 as with the first and second switches 114 and 116. The node 122 is interconnected to a fourth switch 124 which, in turn, is interconnected to the connection 102 and then to the DC adapter 104. The fourth switch 124 is configured as an exclusive or (XOR) switch between the relay 112 (as labeled by the circled number 1) and a vehicle ignition relay (not shown but labeled by the circled number 2). It will also be understood that the fourth switch 124 will default to the position defined by the relay switch 112 (i.e., the fourth switch 124, although an XOR switch, will reflect the position of the relay switch 112 regardless of the vehicle ignition relay if the relay switch 112 effectuated). Thus, if both the relay switch 112 and the vehicle ignition relay switch are actuated, the fourth switch 124 will be controlled by the logic associated with the relay switch 112 and will ignore the position of the vehicle ignition relay switch.

The node 122 is further interconnected with a fifth switch 126 which acts as a manual "kill" switch which can be actuated by a user to shut down the system 20 by actuating the fifth switch 126. The other side of the fifth switch 126 extends into a fuse 128 which can further shut down the system 20 upon encountering an undesirable level of current in the system 20. The output of the fuse 128 extends into the inverter 100. The output of the inverter 100 is interconnected to a sixth switch 130 which is also identified by a circled number 1 indicating a connection to the relay switch 112. The other side of the switch 130 is interconnected to the node 106 which is interconnected to the connection 108 and to the power distribution panel 110.

It can also be seen that the output of the power distribution panel 110 can have individual switches 132 interconnected between the power distribution panel 110 and a corresponding module 26 provided in the system 20. It can also be seen that each of the individual module switches 132 is interconnected by appropriate connections to a microcontroller 134. The microcontroller 134 can thereby actuate independently each of the individual module switches 132 as needed to activate the particular modules 26. The microcontroller 134 preferably has a battery backup 136 to retain programming and memory function in case of a power loss. As can also be seen in FIG. 10, any or all of the modules 26 (particularly those that are temperature sensitive such as cooling and warming components thereof) to be provided with temperature probes 138 at each of the modules., which are interconnected by appropriate connections to the microcontroller 134. The microcontroller 134 also has a suitable sensor 140 for detecting an "AC on" signal with respect to the relay switch 112, i.e., indicating that alternating current is being supplied to the electrical subsystem 70 instead of an alternate power source. The microcontroller 134 can also have a suitable sensor 142 which is preferably interconnected to the battery 92 which can send an appropriate "battery on" signal as well as various battery information such as voltage and temperature. With the information from the probes and sensors, the microcontroller 134 can provide an output on a display panel 144 as to an indication of the status of the electrical subsystem 70 of the system 20.

In operation, when the plug 98 is plugged into a suitable wall power source of 120-volt alternating current, the relay switch 112 fires to close the first switch 114 to provide power to the battery charger 94 and thus charge the battery 92. The second switch 116 also closes to provide the alternating current supplied by the plug 98 to the node 106 and thus to the power distribution panel 110. The third and fourth switches 120 and 124 remain open. Thus, the alternating current supplied to the system and the plug 98 is properly connected to a source of alternating current power.

When the plug 98 is unplugged (and the adapter 104 has not yet been connected to a source of DC current), the relay switch 112 opens and thus opens the first and second switches 114 and 116 to disconnect the plug 98 from the battery charger 94 and the power distribution panel 110. The third switch 120 is closed to interconnect battery 92 with the node 122 and thus to the DC-to-AC inverter 100. Of course, it is assumed that the manual kill switch 126 is in the closed position. Finally, the switch 130 is closed by the relay 112 to create a current path from the battery 92 through the DC-to-AC inverter 100 to the power distribution panel 110 so that the modules 26 are powered by the battery 92.

Finally, when the plug 98 remains unplugged and the adapter 104 is connected to a source of DC current such as the vehicle cigarette lighter, the relay switch 112 opens and thus opens the first, second switches 114 and 116, thus preventing any AC current from being interconnected to the battery charger 94 and the power distribution channel 110. The fourth switch 124 is closed and the third switch 120 is opened, thus preventing any backflow of current into the battery 92 and the battery charger 94, while electrically interconnecting the adapter 104 to the inverter 100 through the manual kill switch 126 and the fuse 128. The switch 130 is closed to thereby connect the adapter 104 to the power distribution panel 110 so that the modules 26 are powered by the DC current of the vehicular electrical system via the adapter 104.

It can also be seen that power saving benefits can be obtained by the use of the microcontroller 134 in detecting temperature variations to the temperature probes 138 interconnected thereto. In this manner, the microcontroller 134 can perform cycling and other power-saving functions (i.e., activating and deactivating warming and cooling units making up the modules 26) to save power, especially when powered by the battery 92 or the vehicular DC power supply to the adapter 104. These power-saving functions can be accomplished by independently activating and deactivating the switches 132 interconnected to the power distribution panel and to the microcontroller 134.

Turning to FIGS. 11–20, various embodiments and configurations of the system 20 are shown for purposes of illustration of the wide variety of configurations of the invention. For example, turning to FIG. 11, one embodiment of the system 20 is shown having a control panel 150 (which, of course, would be interconnected to the microcontroller 134 shown in FIG. 10) to provide an indication of the status of the system 20 and particularly the electrical subsystem 70. One module 26 comprises a drink tank 152 with several spigots 154 thereon to dispense beverages from the drink tank 152. Another module 26 can comprise a refrigerated drawer 156, a warming drawer 158, a corporate drawer 160 having a pair of crock pots 162 therein. Another module 26 can comprise a storage drawer 164.

Figure 15:
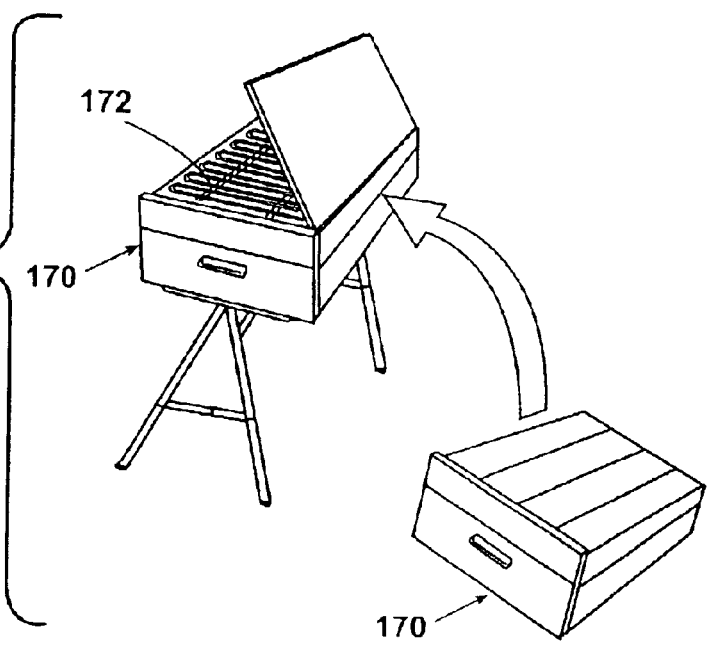
FIG. 15 is an example of a modular component used in the system of FIG. 1 comprising a portable grill movable from a stored position within the system of FIG. 1 to an erected position with foldable legs and a stored cooking surface.

A more compact version of the system 20 is shown in FIG. 12. A first portion of the housing 22 includes a mini-refrigerator 166 in juxtaposed relationship to a warming drawer 168 and a portable grill 170. FIG. 13 shows a front elevational view of the mini-refrigerator in greater detail. FIG. 14 shows a compartmentalized version of the warming drawer 168 in greater detail. FIG. 15 shows the portable grill 170 being moved from a stored position in which it forms one of the modules 26 on the system 20 to an erected position in which a cooking surface 172 can be exposed by pivoting a cover on the grill 170 and foldable legs can position the cooking surface at an ergonomic cooking height.

Figure 16:
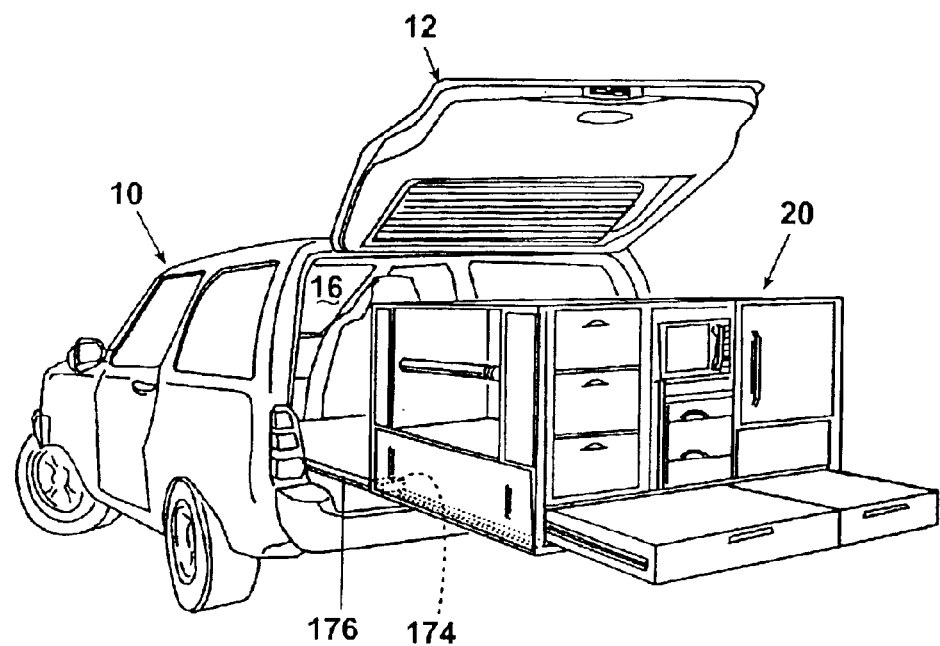
FIG. 16 is an alternative embodiment of the system shown in FIG. 1 where the system is mounted on a platform which is mounted for movement to the hatchback portion of the vehicle so that the system can be retracted and extended from the hatchback portion between a stored and the use position, respectively.
Figure 17:
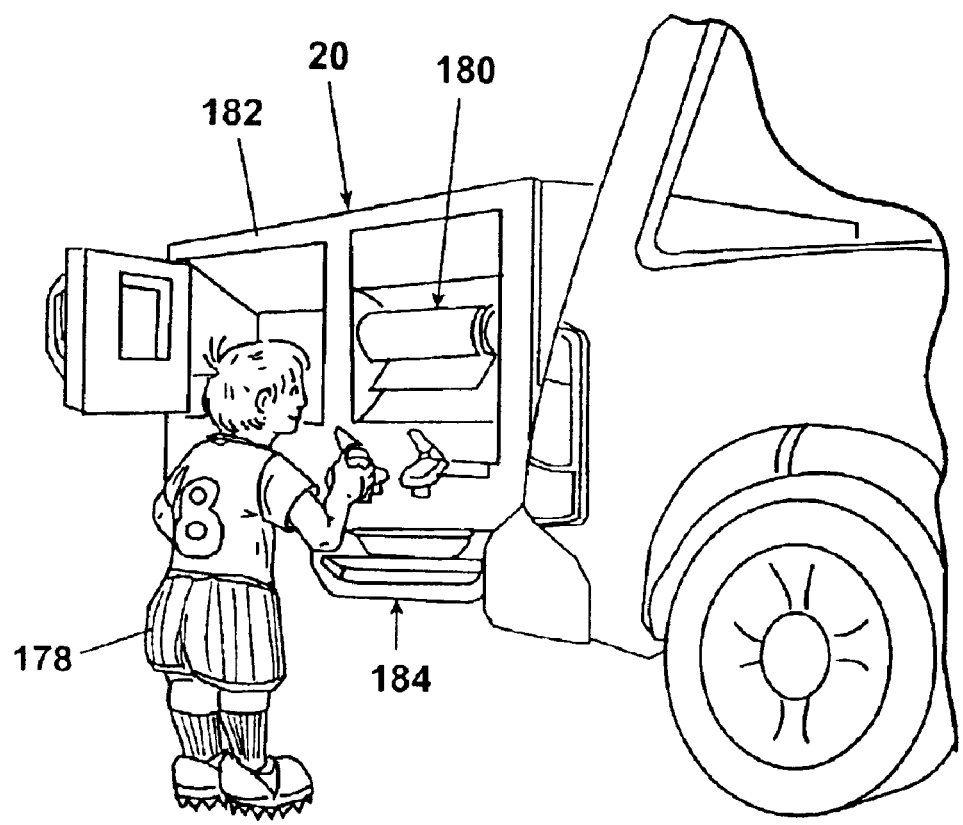
FIG. 17 shows an alternative embodiment of the system shown in FIG. 1 in which a group gathering attendee is shown accessing convenience items stored in a side panel of the system when the system has been moved to the extended position with respect to the hatchback portion of the vehicle.

FIG. 16 shows a vehicle 10 having a hatchback 12 with the system 20 extended from the hatchback recess 16 via a slidable mounting comprising wheel bearing 174 slidably mounted on rails 176 mounted to an interior floor portion of the hatchback portion 16 of the vehicle. FIG. 17 shows a child 178 accessing a cleaning station with paper toweling 180 in a side panel 182 of the system 20. As can also be seen in FIG. 17, a cleaning sink 184 can be provided with a running water faucet 186 (of course, the water faucet 186 would be operably interconnected to the water subsystem 66).

Figure 18:
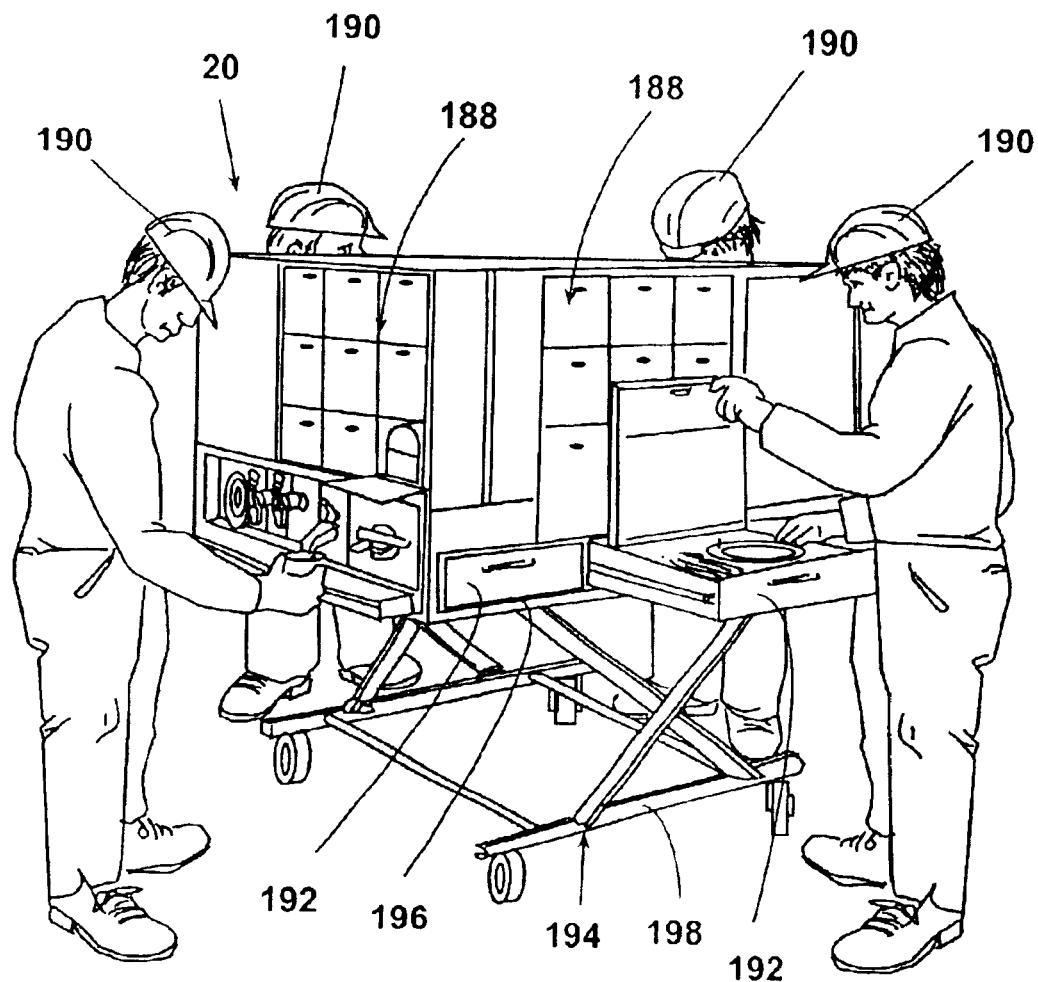
FIG. 18 shows an alternative configuration of the system shown in FIG. 1 in which the system has been reconfigured for use at a construction work site whereby the system includes a lunch box storage unit which is capable of keeping food warm and/or cold as desired as well as a cleaning station with running water and at least one storage compartment.
Figure 19:
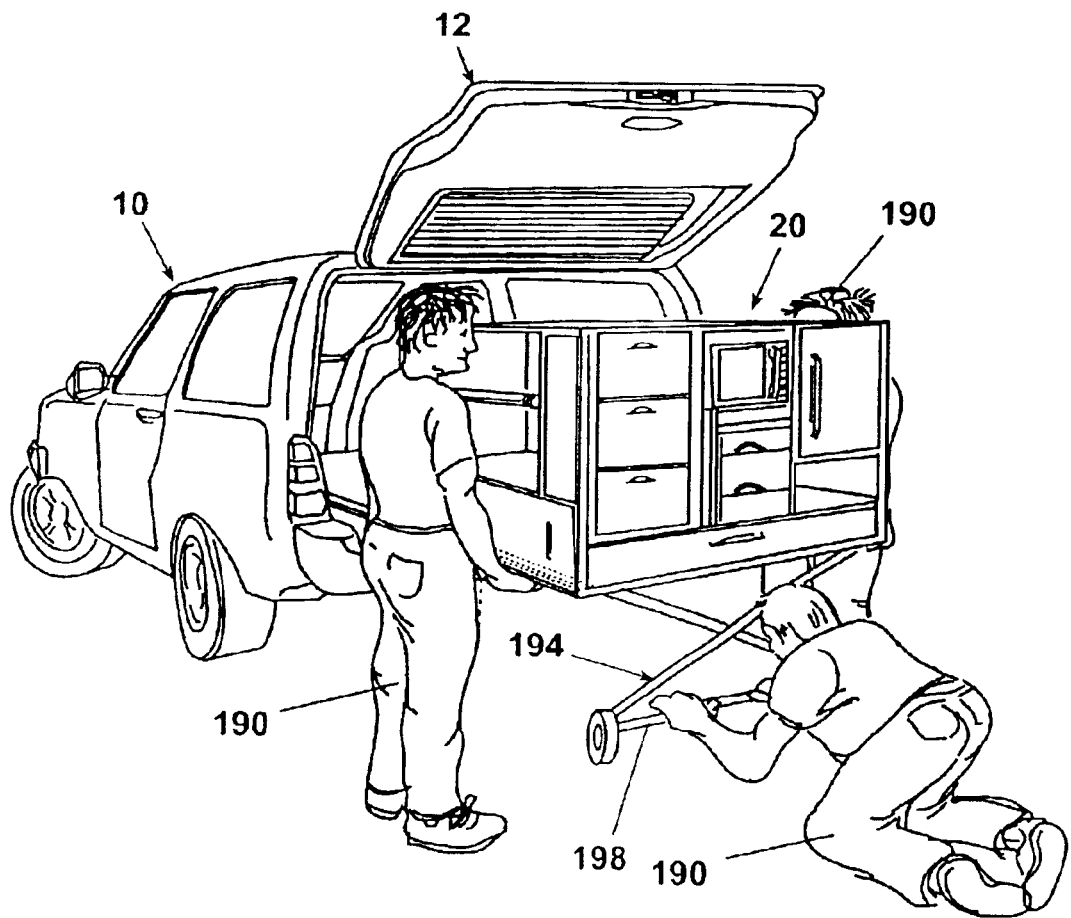
FIG. 19 shows another alternative embodiment of the system shown in FIG. 1 whereby the system has been provided with a scissor-lift mechanism which allows the system to be extended from the hatchback portion of the vehicle, at which time the scissor-lift mechanism can be depended from an underside of the system and engaged with the ground for wheeling the system away from the vehicle.
Figure 20:
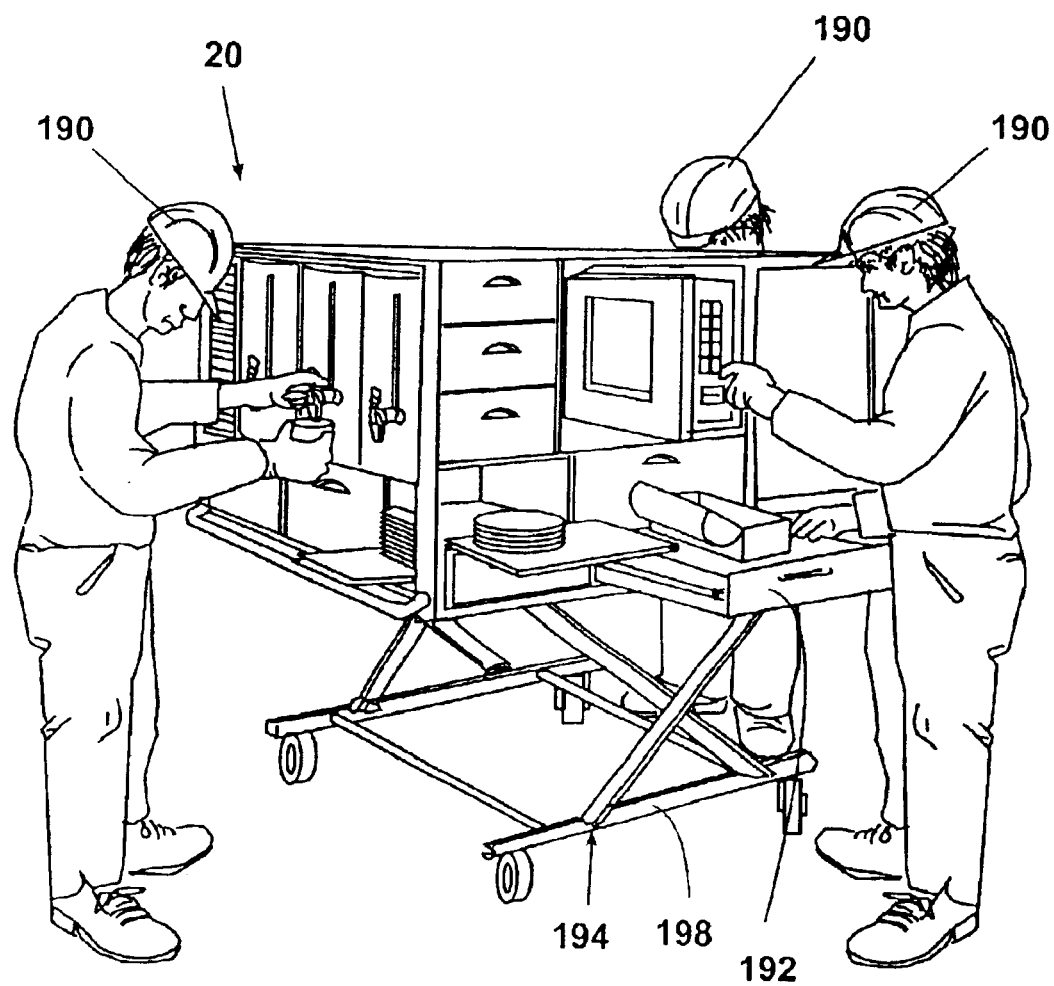
FIG. 20 shows the alternative embodiment of the system shown in FIG. 19 with the scissor-lift mechanism extended and the system wheeled away from the vehicle.

FIG. 18 shows the system 20 configured for use at a construction worksite. For example, in addition to the features shown in the previous embodiments of FIGS. 1–17, the system 20 could also include several compartments (preferably, some heated, some cooled) 188 for storage of lunch boxes for construction workers 190. Other storage drawers 192 could also be provided for additional items for storage. In addition, as can be seen in FIG. 18, a "scissor lift" mechanism 194 is provided between a lower edge 196 of the system 20 and a base portion 198. The scissor lift 194 is preferably selectively mountable between a retracted position and an extended position so that the system 20 can be stored and removed/erected from the vehicle 10 as shown in FIG. 19 and FIG. 20, respectively.

Figure 21:
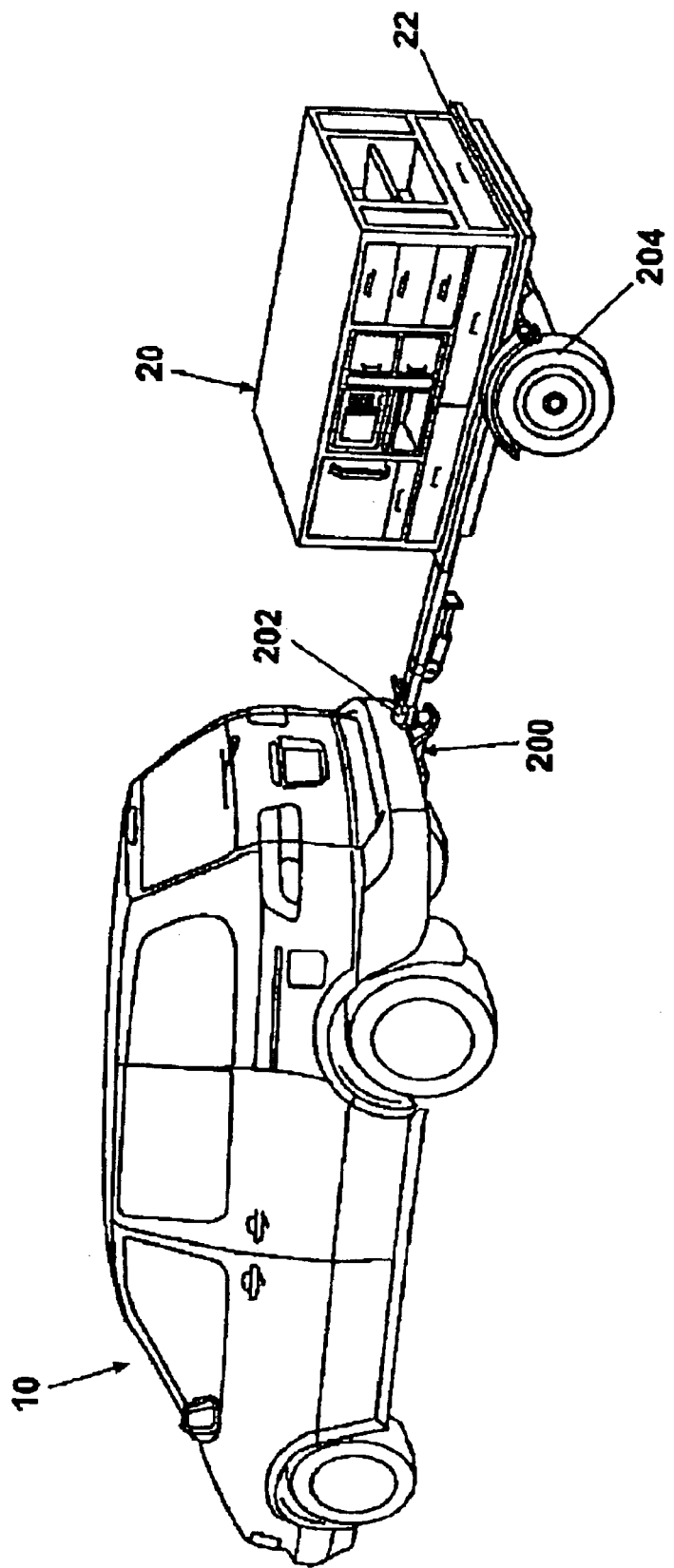
FIG. 21 shows another alternative embodiment of the system shown in FIG. 1 whereby the system has been provided with a hitch that mates with a hitch receiver on the vehicle and further includes ground engaging wheels for transportation of the system when mounted behind the vehicle.

As can be seen in these drawings, in addition to the vehicle 10 being provided with a pair of elongated rails in generally juxtaposed parallel relationship in a rear storage portion thereof and the housing is slidably mourned within the vehicle rear storage portion upon the rails between a refracted and an extended position, other mounting configurations for mounting the system to the vehicle 10 can be provided without departing from the scope of this invention. For example, as shown in FIG. 21, the vehicle 10 can have either a hitch or a hitch receiver 202 on a rear portion thereof and the housing 22 can have the other of the components on a forward portion thereof, and the housing 22 can be provided with a pair of ground-engaging wheels 204 whereby the housing 22 can be towed behind the vehicle 10 when the hitch receiver 202 is mounted to the hitch 200.

While the invention has been specifically described in connection with certain specific embodiments thereof, it is to be understood that this is by way of illustration and not of limitation, and the scope of any appended claims should be construed as broadly as the prior art will permit.

What is claimed is:

1. A tailgating system for a vehicle comprising:
   a housing removably mountable to a vehicle and selectively interconnectable to a power source comprising at least one of a vehicle DC power source when the vehicle is in an unignited state, a vehicle DC power source when the vehicle is in an ignited state, and an AC power source, the housing having at least one recess defined therein; and
   at least two modular components having at least one of warming, cooling and cooking functionality, wherein at least one of the at least two modular components can be selectively and removably received in the at least one recess and is interconnectable to the power source;
   whereby the tailgating system can be reconfigured for different events by selecting different ones of the at least two modular components and mounting the selected ones within the at least one recess in the housing and connecting the same to the power source.

2. The system of claim 1 wherein at least one of the at least two modular components comprises a warmer adapted to be removably mounted within the at least one recess of the housing and interconnected to the power source.

3. The system of claim 2 wherein at least one of the at least two modular components comprises a warming drawer adapted to be slidably mounted within the at least one recess of the housing and interconnected to the power source.

4. The system of claim 3 wherein at least one of the at least two modular components comprises a cooling drawer adapted to be slidably mounted within the at least one recess of the housing and interconnected to the power source.

5. The system of claim 4 wherein at least one of the at least two modular components comprises a refrigerator adapted to be mounted within the at least one recess of the housing and interconnected to the power source.

6. The system of claim 5 wherein at least one of the at least two modular components comprises a cooler adapted to be mounted within the at least one recess of the housing.

7. The system of claim 1 wherein at least one of the at least two modular components comprises a warming drawer adapted to be slidably mounted within the at least one recess of the housing and interconnected to the power source.

8. The system of claim 1 wherein at least one of the at least two modular components comprises a cooling drawer adapted to be slidably mounted within the at least one recess of the housing and interconnected to the power source.

9. The system of claim 1 wherein at least one of the at least two modular components comprises a refrigerator adapted to be mounted within the at least one recess of the housing and interconnected to the power source.

10. The system of claim 1 wherein at least one of the at least two modular components comprises a cooler adapted to be mounted within the at least one recess of the housing.

11. The system of claim 1 and further comprising an entertainment system mounted to the housing and interconnected to the power source for providing entertainment to users of the system.

12. The system of claim 1 and further comprising an audio entertainment system mounted to the housing and interconnected to the power source for providing audible entertainment to users of the system.

13. The system of claim 1 and further comprising a video entertainment system mounted to the housing and interconnected to the power source for providing visible entertainment to users of the system.

14. The system of claim 1 wherein the housing is divided into a warm zone and a cool zone, wherein the warm zone is heated by a temperature increaser, and wherein the cool zone is cooled by a temperature decreaser.

15. The system of claim 14 and wherein an insulation layer separates the warm and cool zones.

16. The system of claim 1 and further comprising a sink mounted to the housing.

17. The system of claim 16 and further comprising at least one fresh water tank mounted to the housing for dispensing fresh water into the sink.

18. The system of claim 17 wherein the fresh water tank is in fluid communication with a warm zone within the housing to heat water dispensed from the tank into the sink.

19. The system of claim 18 and further comprising a water heater mounted to the housing to heat water dispensed from the tank into the sink.

20. The system of claim 1 and further comprising a sink mounted to the housing and at least one fresh water tank mounted to the housing for dispensing fresh water into the sink.

21. The system of claim 20 and further comprising an icemaker fluidly interconnected to the fresh water tank.

22. The system of claim 21 and further comprising a waste tank mounted to the housing and fluidly interconnected to the at least one recess for collecting waste therefrom.

23. The system of claim 22 wherein sink has a drain, wherein the drain in the sink is fluidly interconnected to the waste tank whereby the waste tank receives waste fluid exiting the sink through the drain.

24. The system of claim 1 and further comprising a beverage dispenser mounted to the housing comprising a stored volume of a preselected beverage and a dispenser operably interconnected to the stored volume for selected dispensing of the beverage therein.

25. The system of claim 24 wherein the beverage dispenser further comprises a source of pressurized fluid interconnected to the stored volume of beverage for carbonation thereof.

26. The system of claim 1 wherein a top surface of the housing further comprises at least one cookstove burner thereon, the at least one burner being interconnected to the power source.

27. The system of claim 1 and further comprising a cooking device mounted to the housing for movement between a stored position proximate the housing and a use position distal to the housing.

28. The system of claim 27 wherein the cooking device is detachably mounted to the housing and, in the use position, the cooking device is disconnected from the housing.

29. The system of claim 27 wherein the cooking device is a grill.

30. The system of claim 29 wherein the grill employs charcoal as a cooking fuel.

31. The system of claim 29 wherein the grill employs ignited gas as a cooking fuel.

32. The system of claim 1 and further comprising a power source detector on the housing and interconnected to the power source for determining the particular source of power supplied to the housing.

33. The system of claim 32 and further comprising a power optimizer operably interconnected to the power source detector for optimizing the supplied to at least one of the onboard modular components.

34. The system of claim 1 wherein the vehicle has a rear storage portion thereof provided with a pair of elongated rails in generally juxtaposed parallel relationship and the housing is slidably mounted within the vehicle rear storage portion upon the rails between a retracted and an extended position.

35. The system of claim 1 and further comprising a power cycling component interconnectable to the power source for periodically preventing at least one of the onboard modular components from drawing power from the power source to conserve energy required by the system.

36. The system of claim 1 wherein the vehicle has one of a hitch and a hitch receiver on a rear portion thereof, the housing has the other of a hitch and a hitch receiver on a forward portion thereof, and the housing is provided with a pair of ground-engaging wheels whereby the housing can be towed behind the vehicle when the hitch receiver is mounted to the hitch.

37. The system of claim 33 and further comprising a power cycling component interconnectable to the power source for periodically preventing at least one of the onboard modular components from drawing power from the power source to conserve energy required by the system.

38. A method for preparing a system for a tailgating event, the system including a housing with at least one recess defined therein, and wherein the housing is selectively interconnectable to a power source, the method comprising the steps of:
choosing at least one modular component having at least one of warming, cooling and cooking functionality based on characteristics of the tailgating event; and
mounting the chosen at least one modular component to a corresponding one of the at least one recess in the housing.

39. The method of claim 38 and further comprising the step of operably interconnecting the chosen at least one module component to the power source.

40. The method of claim 39 wherein the power source comprises at least one of a vehicle DC power source when the vehicle is in an unignited state, a vehicle DC power source when the vehicle is in an ignited state, and an AC power source.

41. The method of claim 40 and further comprising the step of reconfiguring the system with different onboard modular components for a different tailgating event with different characteristics.

42. The method of claim 38 wherein the power source comprises at least one of a vehicle DC power source when the vehicle is in an unignited state, a vehicle DC power source when the vehicle is in an ignited state, and an AC power source.

43. The method of claim 38 and further comprising the step of reconfiguring the system with different onboard modular components for a different tailgating event with different characteristics.

* * * * *